United States Patent
Xiong et al.

(10) Patent No.: US 12,486,195 B1
(45) Date of Patent: Dec. 2, 2025

(54) METHOD AND APPLICATION OF ISOTROPIC SHRINKAGE OF THREE-DIMENSIONAL MICRO-NANOSTRUCTURE

(71) Applicant: HUAZHONG UNIVERSITY OF SCIENCE AND TECHNOLOGY, Hubei (CN)

(72) Inventors: Wei Xiong, Hubei (CN); Huace Hu, Hubei (CN); Hui Gao, Hubei (CN); Mingduo Zhang, Hubei (CN); Songyan Xue, Hubei (CN); Leimin Deng, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 19/199,337

(22) Filed: May 5, 2025

(30) Foreign Application Priority Data

May 31, 2024 (CN) .......................... 202410699513.X

(51) Int. Cl.
*C03C 17/10* (2006.01)
*B05D 1/00* (2006.01)

(52) U.S. Cl.
CPC .............. *C03C 17/10* (2013.01); *B05D 1/005* (2013.01); *C03C 2217/216* (2013.01);
(Continued)

(58) Field of Classification Search
None
See application file for complete search history.

(56) References Cited

U.S. PATENT DOCUMENTS

| 4,539,222 A | 9/1985 | Anderson, Jr. et al. |
| 2005/0048414 A1 | 3/2005 | Harnack et al. |
| 2017/0256406 A1 | 9/2017 | Cheng |

FOREIGN PATENT DOCUMENTS

| CN | 106444271 | 2/2017 |
| CN | 111253598 | 6/2020 |

(Continued)

OTHER PUBLICATIONS

Daryl W. Yee et al., "Additive Manufacturing of 3D-Architected Multifunctional Metal Oxides", Advanced Materials, Aug. 2019, pp. 1-29, vol. 31.

(Continued)

*Primary Examiner* — Michael P. Rodriguez
(74) *Attorney, Agent, or Firm* — JCIPRNET

(57) ABSTRACT

The disclosure belongs to a field of a micro-nano processing technology, and more specifically, relates to a method and application of isotropic shrinkage of a three-dimensional micro-nanostructure. In the disclosure, the high polymer film is prepared by mixing the high polymer material and the solvent, and then spin-coating it on a surface of a substrate. Then, the high polymer film is etched to expose a portion of the surface of the substrate, and a raw material of a three-dimensional structure is processed into a target three-dimensional structure with an etched area as an initial processing position. Then, the target three-dimensional structure is subjected to a stiffness strengthening treatment, immersed in a solvent, and pyrolyzed and calcined to obtain an isotropically shrunk three-dimensional micro-nanostructure.

9 Claims, 4 Drawing Sheets

(52) U.S. Cl.
CPC .. *C03C 2217/217* (2013.01); *C03C 2217/253* (2013.01); *C03C 2218/119* (2013.01); *C03C 2218/32* (2013.01); *C03C 2218/34* (2013.01); *C03C 2218/355* (2013.01)

(56) References Cited

FOREIGN PATENT DOCUMENTS

| | | | | |
|---|---|---|---|---|
| CN | 112947002 | | 6/2021 | |
| CN | 115555578 | | 1/2023 | |
| CN | 115555578 A | * | 1/2023 | ............. B22F 10/20 |
| WO | 2012057706 | | 5/2012 | |

OTHER PUBLICATIONS

Jingwei Liu et al., "3D Printing Nano-Architected Semiconductors Based on Versatile and Customizable Metal-Bound Composite Photoresins", Advanced Materials, Nov. 16, 2021, pp. 1-8.

Andrey Vyatskikh et al., "Additive Manufacturing of High-Refractive-Index, Nanoarchitected Titanium Dioxide for 3D Dielectric Photonic Crystals", Nano Letters, Apr. 27, 2020, pp. 3513-3520, vol. 20.

Tomohiro Mori et al., "Pick and place process for uniform shrinking of 3D printed micro- and nano-architected materials", Nature Communications, Sep. 21, 2023, pp. 1-9, vol. 14.

Hehao Chen et al., "A Generalized Polymer Precursor Ink Design for 3D Printing of Functional Metal Oxides", Nano-Micro Letters, Jul. 13, 2023, pp. 1-16, vol. 15.

Xue; Songyan et al., "Research Progress and Application of Femtosecond Laser-Induced Patterned Growth of Nanomaterials", China Laser, Mar. 7, 2022, with English abstract, pp. 1-23, vol. 49, No. 12.

* cited by examiner

METHOD AND APPLICATION OF ISOTROPIC SHRINKAGE OF THREE-DIMENSIONAL MICRO-NANOSTRUCTURE

CROSS-REFERENCE TO RELATED APPLICATION

This application claims the priority benefit of China application serial no. 202410699513.X, filed on May 31, 2024. The entirety of the above-mentioned patent application is hereby incorporated by reference herein and made a part of this specification.

BACKGROUND

Technical Field

The disclosure belongs to a field of a micro-nano processing technology, and more specifically, relates to a method and application of isotropic shrinkage of a three-dimensional micro-nanostructure.

Description of Related Art

A three-dimensional (3D) micro-nanostructure refers to a functional material or a structure with complex 3D morphologies at a micro-nanoscale, which not only has novel physical properties such as quantum effects, size effects, and surface effects endowed by a nanomaterial and a structure, but may also achieve coordinated modulation of the physical properties such as spin polarization, exciton behavior, electron transport and coupling, and wavefront regulation through a 3D geometric structure. Therefore, the 3D micro-nanostructure has become a focus of current research on an application of a micro-nano technology. For example, the 3D micro-nanostructure has a greater specific surface area than a conventional two-dimensional structure, which may significantly improve sensitivity of a metal oxide microsensor and energy density of an energy storage device. A localized surface plasmon resonance effect of a 3D metal nanostructure may be used to enhance an optical signal, thereby improving photocatalytic efficiency and optical detection sensitivity. A 3D zinc oxide micro-nanostructure may be used to prepare vascular stents, medical endoscopes, etc., and are expected to serve in fields of medical testing and tissue repair. A 3D metal nanoarray structure has been successfully applied to development of a flexible electronic device and a 3D integrated microsystem, providing a reliable technical foundation for research and development of civilian electronic products such as flexible electronic skin and wearable devices.

At present, an inorganic 3D micro-nanostructure is generally formed by 3D printing an organic-inorganic mixture on a substrate, and then organic components are decomposed at a high temperature by using a pyrolysis process to obtain the 3D micro-nanostructure. However, during the pyrolysis process, the 3D micro-nanostructure is adhered to the substrate, and detachment of the organic components will cause the 3D micro-nanostructure to shrink in size by 30% to 80%, which will cause severe morphological distortion, limiting stable preparation and large-scale application of the inorganic 3D micro-nanostructure. Therefore, an issue of morphological shrinkage and distortion has become a key challenge in processing, manufacturing, and application development of the 3D micro-nanostructure.

At present, technical routes to solve the issue of morphological shrinkage and distortion caused by the 3D micro-nanostructure during pyrolysis shrinkage mainly include the following two solutions: 1) designing a buffer base, a spring, or a support column at a bottom of the 3D micro-nanostructure to reduce a contact area between the 3D micro-nanostructure and the substrate, thereby slowing down shrinkage and distortion; 2) after peeling off the 3D micro-nanostructure, transferring it to a smooth substrate for pyrolysis to reduce contact force between the structure and the substrate, thereby slowing down the shrinkage and distortion. For example, Research Group of Julia Lab in the United States (Adv. Mater. 2019, 31, e1901345) and Jingwei Liu et al. from Huazhong University of Science and Technology (Adv. Mater. Technol. 2021, 7, 2101230) designed a 3D micro-nanostructure with a base to alleviate the morphological distortion caused during the pyrolysis shrinkage. Andrey Vyatskikh et al. from California Institute of Technology designed a buffer spring at a bottom of a 3D structure (Nano Lett., 2020, 20, (5), 3513-3520), hoping that the spring would act as a shrinkage buffer layer during a pyrolysis process to reduce deformation of the 3D structure. The methods have alleviated the issue of morphological distortion caused by the pyrolysis shrinkage to a certain extent, but have not achieved better results. Tomohiro Mori et al. from Singapore University of Technology and Design proposed a solution in which the 3D micro-nanostructure is peeled off and then transferred to the smooth substrate for pyrolysis (Nat. Commun. 2023, 14, 5876). The 3D micro-nanostructure is transferred to the smooth substrate through a microneedle to reduce adhesion between the 3D structure and the substrate, thereby effectively reducing the morphological distortion caused by structural shrinkage, which, however, also brings about a series of parasitic issues such as time-consuming and cumbersome transfer steps for the microneedle, inability of large-scale insitu preparation, and easy detachment of the structure.

Therefore, there is currently a lack of a method in the world that may completely solve the morphological distortion of the 3D micro-nanostructure during a pyrolysis shrinkage process, making it difficult to achieve distortion-free, large-scale insitu manufacturing of the inorganic 3D micronano structure.

SUMMARY

In view of defects of the related art, a purpose of the disclosure is to provide a method and application of isotropic shrinkage of a three-dimensional micro-nanostructure, aiming to solve an issue of morphological distortion caused by pyrolysis shrinkage of an inorganic 3D micro-nanostructure during a manufacturing process, and to achieve high morphological quality, distortion-free and stable insitu manufacturing of the 3D micro-nanostructure.

To achieve the above objectives, the disclosure provides a method of isotropic shrinkage of a three-dimensional micro-nanostructure, including the following steps:

a step S1, spin-coating a high polymer solution on a substrate, and then performing heat-baking, so as to obtain a high polymer film, in which the high polymer solution is formed by evenly mixing a high polymer material and a solvent, and the high polymer material is one or more of organic polymers with a molecular weight of ≥1000;

a step S2, etching the high polymer film to expose a portion of a surface of the substrate, and processing a raw material of a three-dimensional structure into a target three-dimensional structure with an etched area as an initial processing position, so that the target three-dimensional structure is located at a bottom of the etched area and is in contact with the surface of the substrate, while a bottom of other portions is in contact with a surface of an unetched high polymer film, in which an area ratio of the etched area to a bottom of the target three-dimensional structure is 1:(2 to 100);

the high polymer film and the raw material of the three-dimensional structure have different polarities, so that they are insoluble in each other;

a step S3, performing a stiffness strengthening treatment on the target three-dimensional structure, and then immersing the target three-dimensional structure in the solvent to dissolve the unetched high polymer film to obtain a three-dimensional micro-nano polymer structure;

a step S4, performing pyrolysis on the three-dimensional micro-nano polymer structure to obtain an isotropically shrunk three-dimensional micro-nanostructure.

Preferably, in the step S1, the high polymer material is selected from at least one of polyethylene glycol, polypropylene glycol, polybutylene glycol, polyvinyl chloride, polystyrene, polyisobutylene, polyvinyl alcohol, polyallyl alcohol, a polychloroprene vinylidene chloride-vinyl chloride copolymer, a vinylidene chloride-vinyl chloride copolymer, polychloroprene, and polybutadiene.

Preferably, in the step S1, the solvent is used to dissolve the high polymer material to prepare the high polymer solution, which includes, but not limited to, at least one of aromatic hydrocarbon organic solvents, aliphatic hydrocarbon organic solvents, chlorinated hydrocarbon organic solvents, ketone organic solvents, alcohol organic solvents, benzene organic solvents, tetrahydrofuran, carbon tetrachloride, deionized water, and dimethyl sulfoxide.

Preferably, in the step S1, a mass ratio of the high polymer material to the solvent is (0.01 to 0.5):1.

Further preferably, in the step S1, the mass ratio of the high polymer material to the solvent is (0.05 to 0.1):1.

Preferably, in the step S1, the substrate is selected from at least one of soda-lime glass, a silicon chip, and a silicon dioxide chip.

Preferably, in the step S1, a temperature for the heat-baking is 50° C. to 150° C., and time for the heat-baking is 30 s to 300 s.

Preferably, in the step S2, the etching is selected from at least one of laser etching, mask etching, plasma etching, and mechanical etching.

Preferably, in the step S2, the area ratio of the etched area and the bottom of the target three-dimensional structure is 1:(10 to 50).

Preferably, in the step S3, the stiffness strengthening treatment is performed by at least one of ultraviolet irradiation and the heat-baking.

Preferably, in the step S3, a temperature for the stiffness strengthening treatment is 50° C. to 200° C., and time is 2 h to 12 h.

Preferably, in the step S3, time for immersion in the solvent is 1 h to 6 h.

Preferably, in the step S4, an atmosphere of the pyrolysis includes at least one of air, oxygen, hydrogen, and argon, a temperature for the pyrolysis is 400° C. to 1200° C., and time for the pyrolysis is 5 h to 16 h.

The disclosure provides an isotropically shrunk three-dimensional micro-nanostructure prepared according to the above method.

The disclosure provides a product including the isotropically shrunk three-dimensional micro-nanostructure.

In general, the above technical solutions conceived by the disclosure have the following technical advantages compared to the related art.

(1) The disclosure provides the method of isotropic shrinkage of the three-dimensional micro-nanostructure. The high polymer film is prepared by mixing the high polymer material and the solvent, and then spin-coating it on the surface of the substrate. Then, the high polymer film is etched to expose a portion of the surface of the substrate, and the raw material of the three-dimensional structure is processed into the target three-dimensional structure with the etched area as the initial processing position. Then, the target three-dimensional structure is subjected to the stiffness strengthening treatment, immersed in the solvent, and pyrolyzed and calcined to obtain the isotropically shrunk three-dimensional micro-nanostructure. In the disclosure, the high polymer film us used as a sacrificial layer, so that the prepared 3D micro-nanostructure is located at the bottom of the etched area and in contact with the surface of the substrate, while the bottom of other portions may be suspended on the substrate, thereby solving the morphological distortion of the 3D micro-nanostructure caused by adhesion force of the substrate during the pyrolysis shrinkage, and effectively eradicating the issue of the morphological distortion of the current inorganic 3D micro-nanostructure generated during the manufacturing process. In addition, the method provided in the disclosure also achieves simplified and stabilized insitu preparation of the 3D micro-nanostructure, which is suitable for the integrated in-situ manufacturing of the 3D micro-nano functional structure in fields such as micro-nano optics, electronics, biomedicine, high-precision sensing, energy storage, and provides reliable technical support for processing, manufacturing, and application development of the 3D micro-nanostructure.

(2) The solvent or monomer included in the raw material of the existing three-dimensional structure is usually a weak polar solvent such as acrylic ester and an epoxy resin, or a strong polar solvent such as benzene, alcohol, ether, organic acid. Based on similar principles of insolubility, in the disclosure, strong polar, weak polar, or non-polar high polymer films may be adaptively used for the raw materials of the various three-dimensional structures on the market, so that the polarity of the high polymer film is lower or higher than that of the raw material of the three-dimensional structure, thereby ensuring that the high polymer film may not be dissolved by the raw material of the three-dimensional structure. In the disclosure, the raw materials of the various three-dimensional structures such as organic-inorganic mixtures and precursor resins currently on the market are processed into the target three-dimensional structures with the etched area as the initial processing position, which may achieve distortion-free manufacturing of the various inorganic 3D micro-nanostructures.

(3) In the method of isotropic shrinkage of the three-dimensional micro-nanostructure provided in the disclosure, inexpensive, easily available materials are used, which may achieve the manufacturing of the 3D micro-nano functional structure at a lower cost, and is of great significance to the industrial development of the 3D micro-nano device.

DETAILED DESCRIPTION OF DISCLOSED EMBODIMENTS

In order for purposes, technical solutions, and advantages of the disclosure to be more clearly understood, the disclosure is further described in detail below in conjunction with embodiments. It should be understood that the specific embodiments described herein are only used to explain the disclosure and are not used to limit the disclosure.

Figure 1:
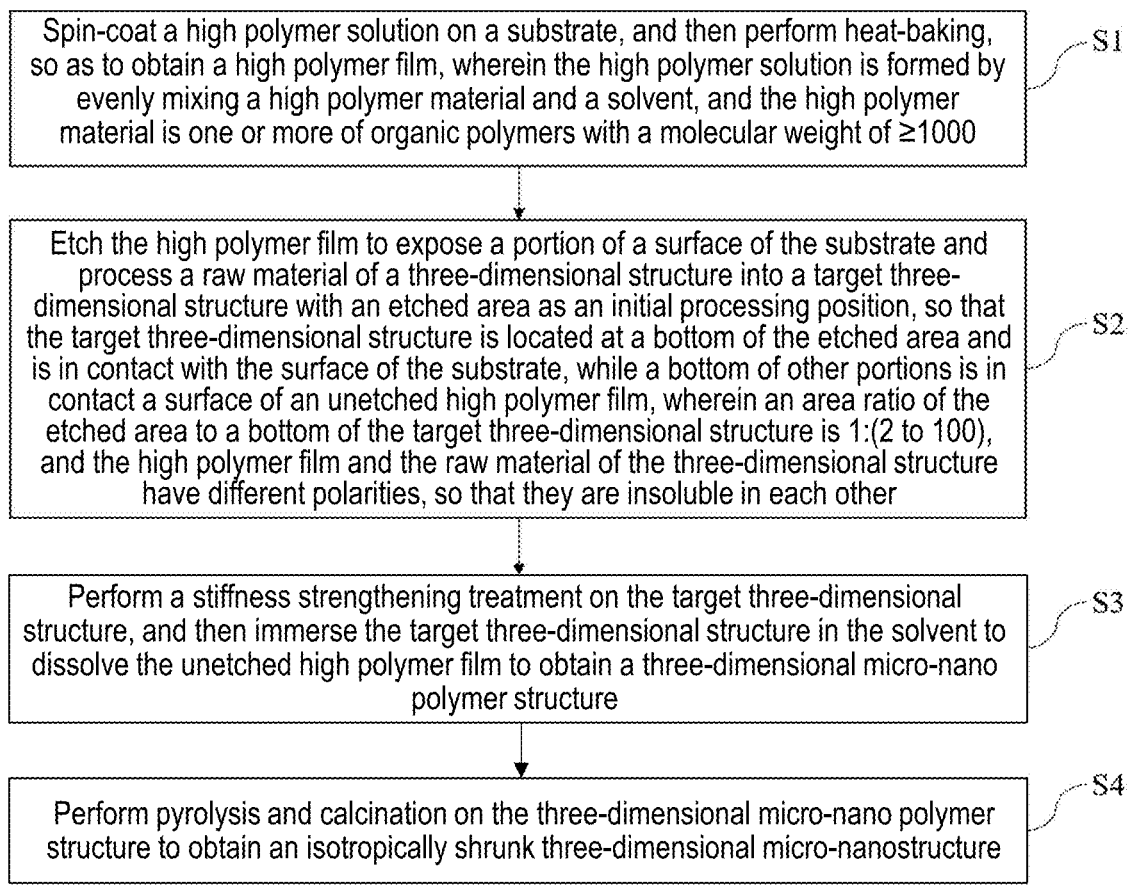
FIG. 1 is a flow chart of a method of isotropic shrinkage of a three-dimensional micro-nanostructure provided in the disclosure.

The disclosure provides a method of isotropic shrinkage of a three-dimensional micro-nanostructure, as shown in FIG. 1, including the following steps.

In a step S1, a high polymer solution is spin-coated on a substrate, and then heat-baking is performed, so as to obtain a high polymer film. The high polymer solution is formed by evenly mixing a high polymer material and a solvent, and the high polymer material is one or more of organic polymers with a molecular weight of ≥1000.

In a step S2, the high polymer film is etched to expose a portion of a surface of the substrate. A raw material of a three-dimensional structure is processed into a target three-dimensional structure with an etched area as an initial processing position. In this way, the target three-dimensional structure is located at a bottom of the etched area and is in contact with the surface of the substrate, while a bottom of other portions is in contact with a surface of an unetched high polymer film. An area ratio of the etched area to a bottom of the target three-dimensional structure is 1:(2 to 100).

The high polymer film and the raw material of the three-dimensional structure have different polarities, so that they are insoluble in each other.

In a step S3, a stiffness strengthening treatment is performed on the target three-dimensional structure, and then the target three-dimensional structure is immersed in the solvent to dissolve the unetched high polymer film to obtain a three-dimensional micro-nano polymer structure.

In a step S4, pyrolysis is performed on the three-dimensional micro-nano polymer structures to obtain isotropically shrunk three-dimensional inorganic micro-nanostructures.

In some embodiments, in the step S1, the high polymer material is selected from at least one of organic polymers having a molecular weight of 1000 to 400000. In a preferred embodiment, the high polymer material is selected from at least one of polyethylene glycol, polypropylene glycol, polybutylene glycol, polyvinyl chloride, polystyrene, polyisobutylene, polyvinyl alcohol, polyallyl alcohol, a polychloroprene vinylidene chloride-vinyl chloride copolymer, a vinylidene chloride-vinyl chloride copolymer, polychloroprene, and polybutadiene.

In the step S1 of the disclosure, the solvent is used to dissolve the high polymer material to prepare the high polymer solution. It should be understood that the disclosure provides no specific limitation to a type of the solvent, as long as it may dissolve the high polymer material. In some embodiments, the solvent includes, but is not limited to, at least one of aromatic hydrocarbon organic solvents, aliphatic hydrocarbon organic solvents, chlorinated hydrocarbon organic solvents, ketone organic solvents, alcohol organic solvents, benzene organic solvents, tetrahydrofuran, carbon tetrachloride, deionized water, and dimethyl sulfoxide.

In some embodiments, in the step S1, a mass ratio of the high polymer material to the solvent is (0.01 to 0.5):1, preferably (0.05 to 0.1):1.

The disclosure provides no limitation to a method of "mixing" in the step S1, as long as the high polymer material and the solvent may be mixed evenly, such as, but not limited to, ultrasonic mixing and stirring mixing. In some embodiments, in the step S1, time for the stirring mixing is not less than 2 h, preferably 2 h to 10 h. It may be understood that those skilled in the art may adaptively extend or shorten time for mixing according to different mixing methods, which is also in the scope of the disclosure.

In some embodiments, in the step S1, the substrate is selected from any one of soda-lime glass, a silicon chip, and a silicon dioxide chip. The disclosure provides no limitation to a type and thickness of the substrate, and the appropriate type and thickness may be selected according to experimental conditions, which are all in the scope of the disclosure. To facilitate laser focusing, in some embodiments, the thickness of the substrate is 0.2 mm to 1 mm, preferably 0.3 mm.

In some embodiments, in the step S1, spin coating parameters are to pre-spin coat at a rotation speed of 100 rps to 750 rps for 5 s to 20 s, and then spin coat at a rotation speed of 750 rps to 5000 rps for at least 60 s. First, the high polymer solution is evenly spread on the substrate by spin coating at a low speed, and then the high polymer solution is formed into a thin film on the substrate by spin coating at a high speed.

In some embodiments, in the step S1, a temperature for the heat-baking is 50° C. to 150° C., and time for the heat-baking is 30 s to 300 s. It should be understood that those skilled in the art may adaptively increase or decrease the temperature for the heat-baking and extend or shorten the time for heat-baking according to a method of a heat-baking treatment, which is also in the scope of the disclosure.

The disclosure provides no limitation to a thickness of the high polymer film, and those skilled in the art may select the appropriate thickness of the high polymer film according to actual requirements, which are all in the scope of the disclosure. In some embodiments, the thickness of the high polymer film is 0.2 μm to 10 μm.

In some embodiments, in the step S2, the etching includes, but is not limited to, at least one of laser etching, mask etching, plasma etching, and mechanical etching.

It should be understood that the disclosure provides no limitation to a type of the raw material of the three-dimensional structure. Any type of the raw material of the three-dimensional structure reported in the related art may be used, which may be an organic-inorganic mixture, or may further be a precursor resin such as a metal ion photosensitive resin, a quantum dot resin, or a metal nanoparticle photosensitive resin. The disclosure provides no limitation to a source of the raw material of the three-dimensional structure, which may be prepared in a laboratory or purchased from commercial products. The disclosure provides no limitation to the solvent or a monomer used to prepare the raw material of the three-dimensional structure, which may be a weak polar solvent such as acrylic ester, an epoxy resin, or a strong polar solvent such as benzene, alcohol, ether, organic acid. In some embodiments, the raw material of the target three-dimensional structure is selected from a metal ion photosensitive resin material (the precursor resin) prepared in a patent document, CN112947002A, and a metal ion gel composite (the organic-inorganic mixture) prepared in a document (Nanomicro Lett, 2023, 15(1): 180.).

In some embodiments, the high polymer film and the raw material of the three-dimensional structure have different polarities, so that the high polymer film and the raw material of the three-dimensional structure are insoluble in each other. In this way, when the raw material of the three-dimensional structure is processed into the target three-dimensional structure with the etched area as the initial processing position, the unetched high polymer film may be in contact with a partial area of the bottom of the target three-dimensional structure without being dissolved by the raw material of the three-dimensional structure.

In some embodiments, in the step S2, the area ratio of the etched area and the bottom of the target three-dimensional structure is 1:(2 to 100), preferably 1:(10 to 50), so that only a small area (the etched area) of the bottom of the obtained target three-dimensional structure is in contact with the substrate, and the other areas of the bottom of the target three-dimensional structure are in contact with the high polymer film.

The disclosure provides no limitation to a method of processing the raw material of the three-dimensional structure into the target three-dimensional structure with the etched area as a center. Those skilled in the art may use any technology well known in the art to process the raw material of the three-dimensional structure into the target three-dimensional structure with the etched area as the initial processing position. Regardless of the technology used, it is within the scope of the disclosure, for example, but not limited to, inkjet printing, aerosol printing, femtosecond laser direct writing, and stereolithography.

In some embodiments, in the step S3, the stiffness strengthening treatment includes, but is not limited to, at least one of ultraviolet irradiation and heat-baking. A purpose is to enhance stiffness of the target three-dimensional structure, so that after it is immersed in the solvent to dissolve the unetched high polymer film, the target three-dimensional structure is located at the bottom of the etched area and is in contact with the surface of the substrate, while the bottom of other portions may be suspended on the substrate. An inventor of the disclosure have discovered through experiments that if the target three-dimensional structure is directly immersed in the solvent without performing the stiffness strengthening treatment, when the unetched high polymer film is dissolved, strength of the target three-dimensional structure is too weak, and structural deformation and the like are prone to occur.

In some embodiments, the stiffness strengthening treatment is performed on the target three-dimensional structure by the heat-baking. In some embodiments of the disclosure, the temperature for the heat-baking is 50° C. to 200° C., and the time for the heat-baking is 2 h to 12 h. It should be understood that those skilled in the art may adaptively increase or decrease the temperature for the heat-baking and extend or shorten the time for the heat-baking according to the method of the heat-baking treatment, which is also in the scope of the disclosure.

In some embodiments, in the step S3, time for immersion in the solvent is 1 h to 6 h. A purpose is to dissolve the unetched high polymer film, so that only the small area (the etched area) at a bottom of the three-dimensional micro-nano polymer structure is in contact with the substrate, and other areas at the bottom of the three-dimensional micro-nano polymer structure may be suspended on the substrate. In a preferred embodiment, in the step S3, the time for the immersion in the solvent is 1 h to 3 h.

In some embodiments, in the step S4, an atmosphere of the pyrolysis includes at least one of oxygen, air, argon, and hydrogen. In practical applications, those skilled in the art may select the appropriate atmosphere of the pyrolysis according to the raw material of the three-dimensional structure.

In some embodiments, in the step S4, a temperature for the pyrolysis is 400° C. to 1200° C., and time for the pyrolysis is 5 h to 16 h.

The disclosure provides a method of preparing an isotropically shrunk three-dimensional micro-nanostructure.

Furthermore, the disclosure further provides an application of the isotropically shrunk three-dimensional micro-nanostructure in preparation of a three-dimensional micro-nano device.

On this basis, the disclosure provides a product including the isotropically shrunk three-dimensional micro-nanostructure.

The technical solutions are described in detail below in conjunction with specific embodiments. It should be understood that these are merely exemplary and are not intended to limit the disclosure, and materials with the same or similar types, models, quality, properties, or functions as the following reagents and instruments may be used to implement the disclosure.

Unless otherwise specified, experimental methods used in the following examples are all conventional methods. Unless otherwise specified, the materials and reagents used in the following examples may be obtained from commercial sources.

The following are examples.

Example 1

Polyvinyl chloride was used as a non-polar high polymer material, and cyclohexanone was used as a non-polar solvent. A femtosecond laser etching technology was used to etch a non-polar high polymer film, and a weak polar zinc ion photosensitive resin (in which a preparation method of a raw material was the same as that of the patent document, CN112947002A) was used to process the 3D micro-nanostructure. Specific steps were as follows.

In the step S1, 750 mg of polyvinyl chloride with a molecular weight of 77000 was taken to be mixed with 10 g of cyclohexanone and stirred magnetically for 6 h to obtain a colorless and transparent polyvinyl chloride solution. A soda-lime glass substrate was fixed on a spin coater. 300 μL of the colorless and transparent polyvinyl chloride solution was taken to be evenly dropped on the substrate. Then, pre-spin coating parameters (a rotation speed of 500 rps and time of 10 s) and spin coating parameters (a rotation speed of 1500 rps and time of 60 s) were set, and spin coating was started. The spin-coated substrate was placed on a heating platform at 75° C. and dried for 80 seconds to obtain the soda-lime glass substrate spin-coated with a polyvinyl chloride film of 0.6 μm.

Figure 2:
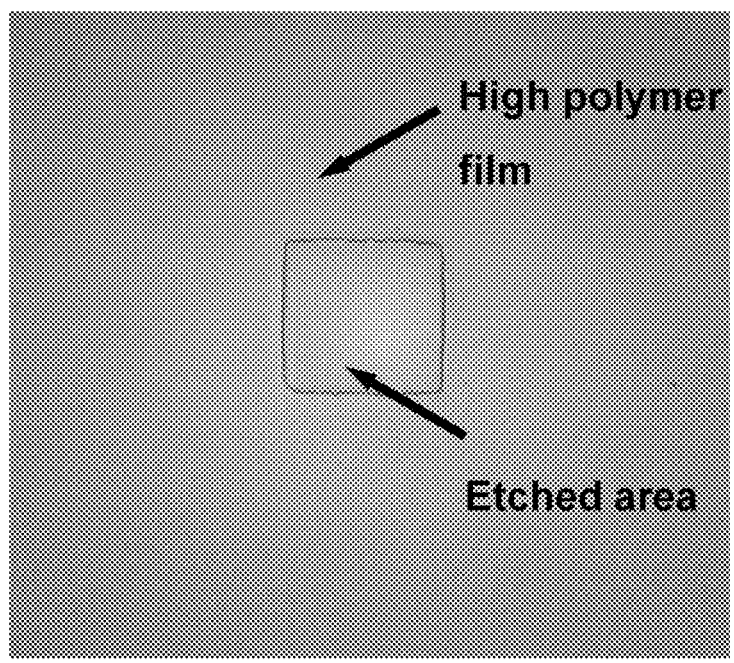
FIG. 2 is an etched image of a high polymer film provided in the disclosure.

In the step S2, the soda-lime glass substrate spin-coated with the polyvinyl chloride film obtained in the step S1 was placed in a femtosecond laser etching system for patterned etching. Etching parameters were set to 10 mm/s and 50 mW. FIG. 2 was the polyvinyl chloride film after the patterned etching. Then, a drop of the zinc ion photosensitive resin was dropped on the above etched area, and the femtosecond laser direct writing technology was used to process the 3D micro-nano polymer structure with the etched area as the center. An area ratio of the etched area to the bottom of the 3D micro-nano polymer structure was 1:40.

Figure 3:
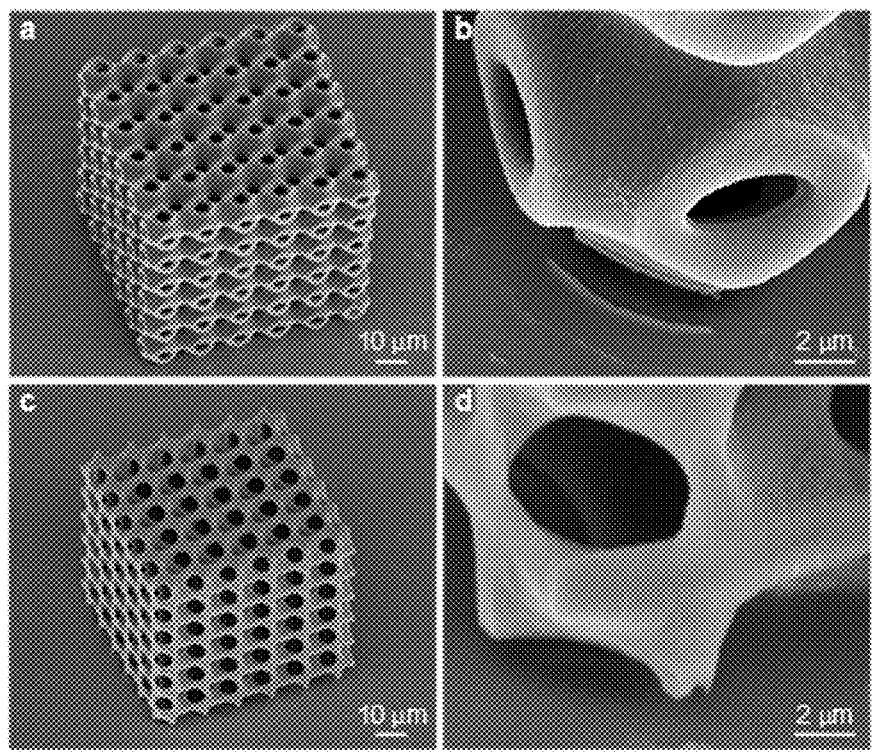
FIG. 3 is an image of a 3D micro-nanostructure of a zinc ion polymer after solvent cleaning provided in Example 1 of the disclosure, in which a content a is a Primitive 3D structure, a content b is a partial enlarged view of the Primitive 3D structure, a content c is a Diamond 3D structure, and a content d is a partial enlarged view of the Diamond 3D structure.

In the step S3, a sample obtained in the step S2 was placed in a baking oven at 80° C. for 10 h for the stiffness strengthening treatment. Then, the sample was taken out to be immersed in a cyclohexanone solvent for 2 h. An image of a 3D micro-nanostructure of a zinc ion polymer after washed with cyclohexanone was shown in FIG. 3. A content a in FIG. 3 was a Primitive 3D structure, and a content b in FIG. 3 was a partial enlarged view of the Primitive 3D structure. A content c in FIG. 3 was a Diamond 3D structure, and a content d in FIG. 3 was a partial enlarged view of the Diamond 3D structure. It may be seen that a bottom of the 3D micro-nanostructure of the zinc ion polymer was in contact with the substrate only through the etched area, and other areas of the bottom of the 3D micro-nanostructure of the zinc ion polymer were suspended on the substrate.

Figure 4:
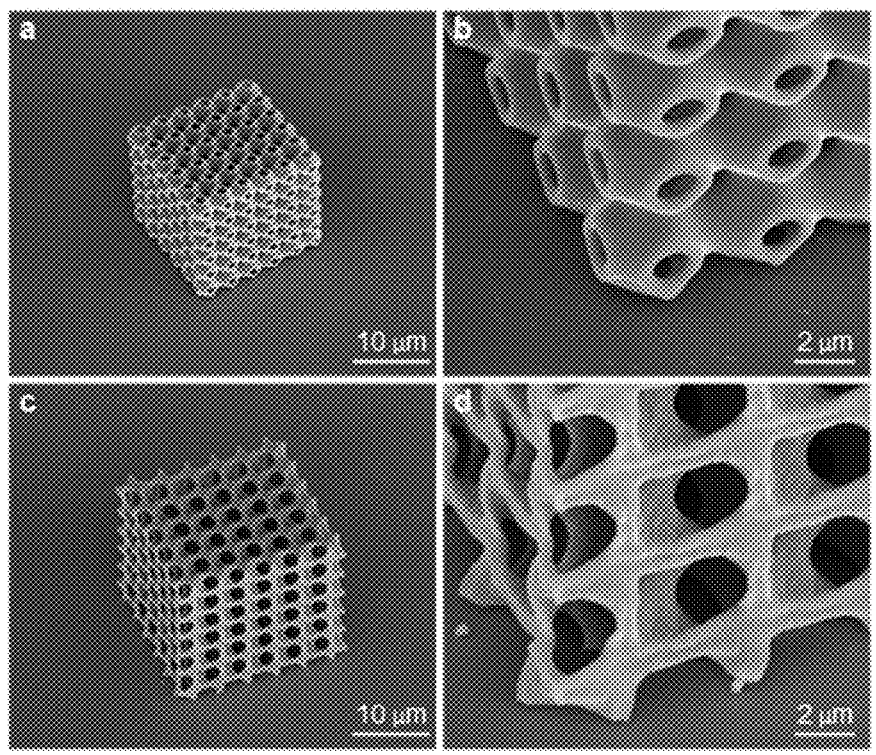
FIG. 4 is an image of an isotropically shrunk zinc oxide 3D micro-nanostructure after pyrolysis provided in Example 1 of the disclosure, in which the content a is the Primitive 3D structure, the content b is the partial enlarged view of the Primitive 3D structure, the content c is the Diamond 3D structure, and the content d is the partial enlarged view of the Diamond 3D structure.

In the step S4, the sample obtained in the step S3 was pyrolyzed and calcined at 600° C. for 10 h under an oxygen atmosphere to obtain a zinc oxide 3D micro-nanostructure (FIG. 4). The content a in FIG. 4 was the Primitive 3D structure, and the content b in FIG. 4 was the partial enlarged view of the Primitive 3D structure. The content c in FIG. 4 was the Diamond 3D structure, and the content d in FIG. 4 was the partial enlarged view of the Diamond 3D structure. It may be seen from FIG. 3 and FIG. 4 that after a pyrolysis treatment was performed on the zinc oxide 3D micro-nanostructure prepared in Example 1 of the disclosure, a morphology of the zinc oxide 3D micro-nanostructure was not distorted, and had high 3D morphological quality.

Example 2

Polyvinyl chloride was used as the non-polar high polymer material, and cyclohexanone was used as the non-polar solvent. The femtosecond laser etching technology was used to etch the non-polar high polymer film, and a weak polar cobalt ion photosensitive resin (in which a preparation method of a raw material was the same as that of the patent document, CN112947002A) was used to process the 3D micro-nanostructure. Specific steps were as follows.

In the step S1, 500 mg of polyvinyl chloride with a molecular weight of 95000 was taken to be mixed with 10 g of cyclohexanone and stirred magnetically for 4 h to obtain the colorless and transparent polyvinyl chloride solution. A silicon dioxide substrate was fixed on the spin coater. Then, 300 μL of the colorless and transparent polyvinyl chloride solution was taken to be evenly dropped on the substrate. The pre-spin coating parameters (the rotation speed of 500 rps and the time of 10 s) and the spin coating parameters (a rotation speed of 2000 rps and the time of 60 s) were set, and the spin coating was started. The spin-coated substrate was placed on the heating platform at 75° C. and dried for 60 s to obtain the silicon dioxide substrate spin-coated with a polyvinyl chloride film of 0.3 μm.

In the step S2, the silicon dioxide substrate spin-coated with the polyvinyl chloride film obtained in the step S1 was placed in the femtosecond laser etching system for the patterned etching. The etching parameters were set to 10 mm/s and 50 mW. Then, a drop of the cobalt ion photosensitive resin was dropped on the above etched area, and the femtosecond laser direct writing technology was used to process the 3D micro-nano polymer structure with the etched area as the center. The area ratio of the etched area to the bottom of the 3D micro-nano polymer structure was 1:16.

In the step S3, the sample obtained in the step S2 was placed in the baking oven at 80° C. for 10 h for the stiffness strengthening treatment. Then, the sample was taken out to be immersed in the cyclohexanone solvent for 1.5 h.

In the step S4, the sample obtained in the step S3 was pyrolyzed and calcined at 800° C. for 6 h under an air atmosphere to obtain a cobalt oxide 3D micro-nanostructure that was not distorted and had high morphological quality.

Example 3

Polyisobutylene was used as the non-polar polymer material, and hexane was used as the non-polar solvent. A plasma etching technology was used to etch the non-polar high polymer film, and the weak polar zinc ion photosensitive resin (the same as in Example 1) was used to process the 3D micro-nanostructure. The specific steps were as follows.

In the step S1, 1000 mg of polyisobutylene with a molecular weight of 3500 was taken to be mixed with 10 g of hexane and stirred magnetically for 6 h to obtain a colorless and transparent polyisobutylene solution. The soda-lime glass substrate was fixed on the spin coater. Then, 300 μL of the colorless and transparent polyisobutylene solution was taken to be evenly dropped on the substrate. The pre-spin coating parameters (the rotation speed of 500 rps and the time of 10 s) and the spin coating parameters (the rotation speed of 1500 rps and the time of 60 s) were set, and the spin coating was started. The spin-coated substrate was placed on the heating platform at 60° C. and dried for 90 s to obtain the soda-lime glass substrate spin-coated with a polyisobutylene film of 2.2 μm.

In the step S2, an AZ photoresist was spin-coated on the soda-lime glass substrate spin-coated with the polyisobutylene film obtained in the step S1. A maskless lithography was used to perform patterning, and then place it in a plasma etching for etching. An etching atmosphere was argon. A chamber pressure was set to 50 mT, and a frequency was set to 20 MHz. Then, a drop of the zinc ion photosensitive resin was dropped on the above etched area, and the femtosecond laser direct writing technology was used to process the 3D micro-nano polymer structure with the etched area as the center. The area ratio of the etched area to the bottom of the 3D micro-nano polymer structure was 1:10.

In the step S3, the sample obtained in the step S2 was placed in the baking oven at 80° C. for 10 h for the stiffness strengthening treatment. Then, the sample was taken out to be immersed in a hexane solvent for 2 h.

In the step S4, the sample obtained in the step S3 was pyrolyzed and calcined at 600° C. for 10 h under the oxygen atmosphere to obtain the zinc oxide 3D micro-nanostructure that was not distorted and had high morphological quality.

Example 4

Polyvinyl alcohol was used as a strong polar high polymer material, and the deionized water was used as the strong polar solvent. A microneedle mechanical etching technology was used to pattern a strong polar polymer film, and the weak polar cobalt ion photosensitive resin (the same as in Example 2) was used to process the 3D micro-nanostructure. The specific steps were as follows.

In the step S1, 500 mg of polyvinyl alcohol with a molecular weight of 300,000 was taken to be mixed with 10 g of the deionized water and stirred magnetically for 3 h to obtain a colorless and transparent polyvinyl alcohol solution. The soda-lime glass substrate was fixed on the spin coater. 300 μL of the colorless and transparent polyvinyl alcohol solution was taken to be evenly dropped on the substrate. Then, the pre-spin coating parameters (the rotation speed of 500 rps and the time of 10 s) and the spin coating parameters (the rotation speed of 2000 rps and the time of 60 s) were set, and the spin coating was started. The spin-coated substrate was placed on the heating platform at 80° C. and dried for 90 s to obtain the soda-lime glass substrate spin-coated with a polyvinyl alcohol film of 0.4 μm.

In the step S2, the soda-lime glass substrate spin-coated with the polyvinyl alcohol film obtained in the step S1 was placed under a microneedle mechanical etcher for the patterned etching. A size of a microneedle was 1 μm, and an etching speed was set to 1 μm/s. Then, a drop of the cobalt ion photosensitive resin was dropped on the above etched area, and the femtosecond laser direct writing technology was used to process the 3D micro-nano polymer structure with the etched area as the center. The area ratio of the etched area to the bottom of the 3D micro-nano polymer structure was 1:50.

In the step S3, the sample obtained in the step S2 was placed in the baking oven at 80° C. for 10 h for the stiffness strengthening treatment. Then, the sample was taken out to be immersed in the deionized water for 2 h.

In the step S4, the sample obtained in the step S3 was pyrolyzed and calcined at 800° C. for 6 h under the oxygen atmosphere to obtain the cobalt oxide 3D micro-nanostructure that was not distorted and had high morphological quality.

Example 5

Polyallyl alcohol was used as the strong polar high polymer material, and the deionized water was used as the strong polar solvent. The femtosecond laser etching technology was used to etch the strong polar polymer film, and a weak polar copper metal ion gel composite (in which a preparation method of a raw material was the same as that of the document, Nanomicro Lett, 2023, 15(1): 180.) was used to process the 3D micro-nano structure. The specific steps were as follows.

In the step S1, 500 mg of polyallyl alcohol with a molecular weight of 2050 was taken to be mixed with 10 g of the deionized water and stirred magnetically for 6 h to obtain a colorless and transparent polyallyl alcohol solution. The soda-lime glass substrate was fixed on the spin coater. 300 μL of the colorless and transparent polyallyl alcohol solution was taken to be evenly dropped on the substrate. Then, the pre-spin coating parameters (the rotation speed of 500 rps and the time of 10 s) and the spin coating parameters (the rotation speed of 1500 rps and the time of 60 s) were set, and the spin coating was started. The spin-coated substrate was placed on the heating platform at 60° C. and dried for 60 s to obtain the soda-lime glass substrate spin-coated with a polyallyl alcohol film of 0.4 μm.

In the step S2, the soda-lime glass substrate spin-coated with polyallyl alcohol film obtained in the step S1 was placed in the femtosecond laser etching system for the patterned etching. The etching parameters were set to 10 mm/s and 45 mW. Then, an inkjet printing technology was used on the above etched area to process a 3D micro-nanostructure of a copper ion gel composite with the etched area as the center. The area ratio of the etched area to the bottom of the 3D micro-nano polymer structure was 1:25.

In the step S3, the sample obtained in the step S2 was placed in the baking oven at 80° C. for 10 h for the stiffness strengthening treatment. Then, the sample was taken out to be immersed in a deionized water solvent for 2 h.

In the step S4, the sample obtained in step S3 was pyrolyzed and calcined at 500° C. for 6 h under the oxygen atmosphere, and then calcined at 1000° C. for 10 h under a hydrogen atmosphere to obtain a copper 3D micro-nanostructure that was not distorted and had high morphological quality.

Example 6

Polybutadiene was used as the non-polar high polymer material, and n-heptane was used as the non-polar solvent. The femtosecond laser etching technology was used to etch the non-polar high polymer film, and a weak polar aluminum metal ion gel composite (in which a preparation method of a raw material was the same as the document, Nanomicro Lett, 2023, 15(1): 180.) was used to process the 3D micro-nanostructure. The specific steps were as follows.

In the step S1, 500 mg of polybutadiene with a molecular weight of 200,000 was taken to be mixed with 10 g of n-heptane and stirred magnetically for 6 h to obtain a colorless and transparent polybutadiene solution. The soda-lime glass substrate was fixed on the spin coater. 300 μL of the colorless and transparent polybutadiene solution was taken to be evenly dropped on the substrate. Then, the pre-spin coating parameters (the rotation speed of 500 rps and the time of 10 s) and the spin coating parameters (the rotation speed of 1500 rps and the time of 60 s) were set, and the spin coating was started. The spin-coated substrate was placed on the heating platform at 60° C. and dried for 60 s to obtain the soda-lime glass substrate spin-coated with a polybutadiene film of 0.5 μm.

In the step S2, the soda-lime glass substrate spin-coated with the polybutadiene film obtained in the step S1 was placed in the femtosecond laser etching system for the patterned etching. The etching parameters were set to 10 mm/s and 45 mW. Then, an aerosol printing technology was used on the above etched area to process a 3D micro-nanostructure of an aluminum ion gel polymer with the etched area as the center. The area ratio of the etched area to the bottom of the 3D micro-nano polymer structure was 1:30.

In the step S3, the sample obtained in the step S2 was placed in the baking oven at 80° C. for 10 h for the stiffness strengthening treatment. Then, the sample was taken out to be immersed in a n-heptane solvent for 2 h.

In the step S4, the sample obtained in the step S3 was pyrolyzed and calcined at 1200° C. for 8 h under the oxygen atmosphere to obtain an aluminum oxide 3D micro-nanostructure that was not distorted and had high morphological quality.

Comparative Example 1

The zinc ion photosensitive resin (the same as in Example 1) was used to process the 3D micro-nanostructure. The specific steps were as follows.

Figure 5:
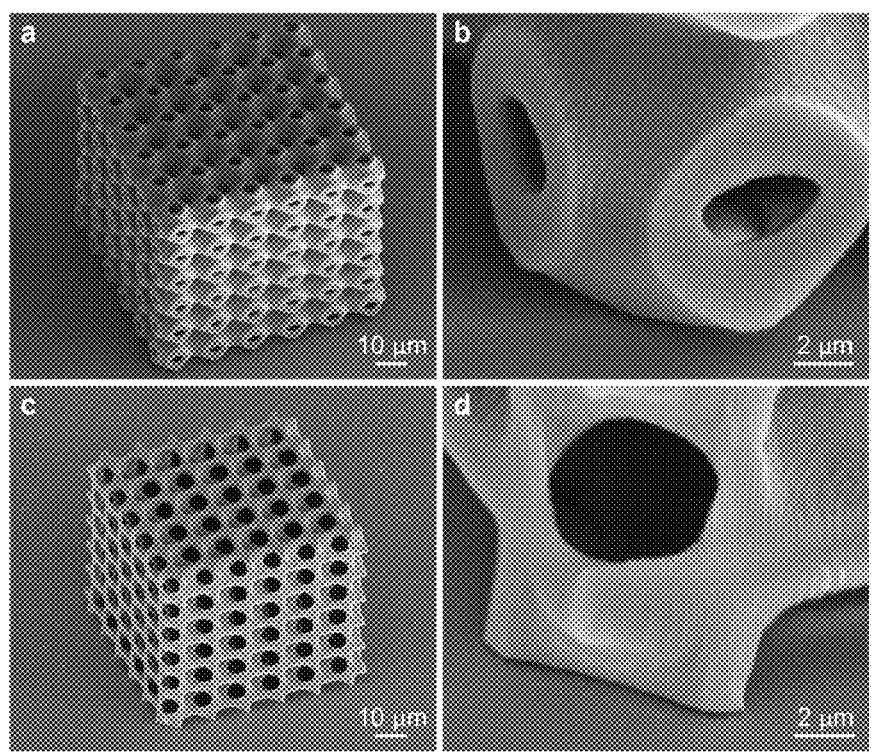
FIG. 5 is an image of a 3D micro-nanostructure of a zinc ion polymer provided in Comparative Example 1 of the disclosure, in which the content a is the Primitive 3D structure, the content b is the partial enlarged view of the Primitive 3D structure, the content c is the Diamond 3D structure, and the content d is the partial enlarged view of the Diamond 3D structure.

In the step S1, a drop of the zinc ion photosensitive resin was dropped on the soda-lime glass substrate, and the femtosecond laser direct writing technology was used to process the 3D micro-nano polymer structure on the substrate. An image of the 3D micro-nano polymer structure was shown in FIG. 5. The content a in FIG. 5 was the Primitive 3D structure, and the content b in FIG. 5 was the partial enlarged view of the Primitive 3D structure. The content c in FIG. 5 was the Diamond 3D structure, and the content d in FIG. 5 was the partial enlarged view of the Diamond 3D structure. It may be seen that the 3D micro-nano polymer structure was in complete contact with the substrate.

Figure 6:
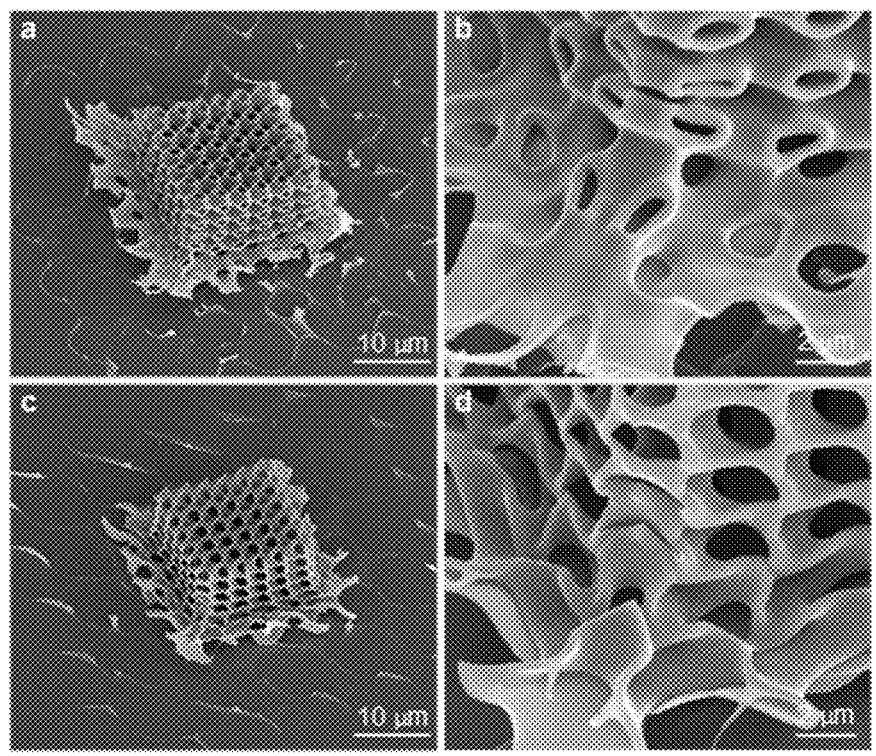
FIG. 6 is an image of a zinc oxide 3D micro-nanostructure after pyrolysis provided in Comparative Example 1 of the disclosure, in which the content a is the Primitive 3D structure, the content b is the partial enlarged view of the Primitive 3D structure, the content c is the Diamond 3D structure, and the content d is the partial enlarged view of the Diamond 3D structure.

In the step S2, the sample obtained in the step S1 was pyrolyzed and calcined at 600° C. for 10 h under the oxygen atmosphere, and the obtained zinc oxide 3D micro-nanostructure was shown in FIG. 6. The content a in FIG. 6 was the primitive 3D structure, and the content b in FIG. 6 was the partial enlarged view of the primitive 3D structure. The content c in FIG. 6 was the diamond 3D structure, and the content d in FIG. 6 was the partial enlarged view of the diamond 3D structure. It may be seen from FIGS. 5 and 6 that the zinc oxide 3D micro-nanostructure had severe morphological distortion and poor morphological quality. A reason was that the zinc oxide 3D micro-nanostructure was adhered to the substrate. During pyrolysis and shrinkage, the zinc oxide 3D micro-nanostructure is stretched and deformed by the substrate, resulting in the severe morphological distortion.

It will be easily understood by those skilled in the art that the above is only a preferred embodiment of the disclosure and is not intended to limit the disclosure. Any modifications, equivalent substitutions, and improvements made within the spirit and principles of the disclosure should be included in the scope of the disclosure.

What is claimed is:

1. A method of isotropic shrinkage of a three-dimensional micro-nanostructure, comprising the following steps:
    S1, spin-coating a high polymer solution on a substrate, and then performing heat-baking, so as to obtain a high polymer film, wherein the high polymer solution is formed by evenly mixing a high polymer material and a solvent, and the high polymer material is one or more of organic polymers with a molecular weight of ≥1000;
    the high polymer material is selected from at least one of polyethylene glycol, polypropylene glycol, polybutylene glycol, polyvinyl chloride, polystyrene, polyisobutylene, polyvinyl alcohol, polyallyl alcohol, a polychloroprene vinylidene chloride-vinyl chloride copolymer, a vinylidene chloride-vinyl chloride copolymer, polychloroprene, and polybutadiene;
    S2, etching the high polymer film to expose a portion of a surface of the substrate, thereby forming an etched area, and then processing a raw material of a three-dimensional structure into a target three-dimensional structure with the etched area as an initial processing position, so that the target three-dimensional structure is located at a bottom of the etched area and is in contact with the surface of the substrate, while a bottom of other portions is in contact with a surface of an unetched high polymer film, wherein an area ratio of the etched area to a bottom of the target three-dimensional structure is 1:(2 to 100);
    the high polymer film and the raw material of the three-dimensional structure have different polarities, so that they are insoluble in each other;
    the raw material of the three-dimensional structure is selected from a metal ion gel composite, a metal ion photosensitive resin, a quantum dot resin, or a metal nanoparticle photosensitive resin;
    the processing of the raw material of the three-dimensional structure into the target three-dimensional structure is performed by a technology selected from at least one of inkjet printing, aerosol printing, femtosecond laser direct writing, and stereolithography;
    S3, performing a stiffness strengthening treatment on the target three-dimensional structure, and then immersing the target three-dimensional structure in the solvent to dissolve the unetched high polymer film to obtain a three-dimensional micro-nano polymer structure;
    S4, performing pyrolysis on the three-dimensional micro-nano polymer structure to obtain an isotropically shrunk three-dimensional micro-nanostructure.

2. The method according to claim 1, wherein in the step S1, a mass ratio of the high polymer material to the solvent is (0.01 to 0.5):1.

3. The method according to claim 1, wherein in the step S1, the substrate is selected from at least one of soda-lime glass, a silicon chip, and a silicon dioxide chip.

4. The method according to claim 1, wherein in the step S1, a temperature for the heat-baking is 50° C. to 150° C., and time for the heat-baking is 30 s to 300 s.

5. The method according to claim 1, wherein in the step S2, the etching is selected from at least one of laser etching, mask etching, plasma etching, and mechanical etching.

6. The method according to claim 1, wherein in the step S3, the stiffness strengthening treatment is performed by at least one of ultraviolet irradiation and an additional heat-baking;
    a temperature for the additional heat-baking is 50° C. to 200°° C., and time is 2 h to 12 h;
    time for the immersion is 1 h to 6 h.

7. The method according to claim 1, wherein in the step S4, an atmosphere of the pyrolysis comprises at least one of air, oxygen, hydrogen, and argon, a temperature for the pyrolysis is 400° C. to 1200° C., and time for the pyrolysis is 5 h to 16 h.

8. An isotropically shrunk three-dimensional micro-nanostructure prepared according to the method according to claim 1.

9. A product comprising the isotropically shrunk three-dimensional micro-nanostructure according to claim 8.

* * * * *